(12) United States Patent
Newton

(10) Patent No.: US 9,157,619 B1
(45) Date of Patent: Oct. 13, 2015

(54) REVERSIBLE POLE OR WALL MOUNTING BRACKET

(71) Applicant: Chad Stuart Newton, Tyrone, GA (US)

(72) Inventor: Chad Stuart Newton, Tyrone, GA (US)

(73) Assignee: Cooper Technologies Company, Houston, TX (US)

( * ) Notice: Subject to any disclaimer, the term of this patent is extended or adjusted under 35 U.S.C. 154(b) by 132 days.

(21) Appl. No.: 14/015,381

(22) Filed: Aug. 30, 2013

(51) Int. Cl.
F21S 8/00 (2006.01)
F21S 13/10 (2006.01)
F21V 21/116 (2006.01)
F16M 13/02 (2006.01)
F21V 21/02 (2006.01)

(52) U.S. Cl.
CPC .............. *F21V 21/116* (2013.01); *F16M 13/02* (2013.01); *F21V 21/02* (2013.01)

(58) Field of Classification Search
CPC ........ F21V 21/116; F21V 21/02; F16M 13/02
USPC ......................................... 362/431, 396, 432
See application file for complete search history.

(56) References Cited

U.S. PATENT DOCUMENTS

| | | | |
|---|---|---|---|
| 5,964,438 A * | 10/1999 | Camilleri ................. | 248/225.21 |
| 6,629,391 B1 * | 10/2003 | Børresen et al. ............... | 52/200 |
| 7,770,858 B2 * | 8/2010 | Fehrenbach et al. ........ | 248/291.1 |
| 2009/0072102 A1 * | 3/2009 | Scott .......................... | 248/205.1 |
| 2011/0023364 A1 * | 2/2011 | Euteneuer et al. ............... | 49/25 |
| 2012/0137499 A1 * | 6/2012 | Agnihotri ....................... | 29/462 |
| 2012/0159892 A1 * | 6/2012 | Summons et al. .............. | 52/700 |
| 2013/0256471 A1 * | 10/2013 | Ruiz et al. .................... | 248/74.2 |

* cited by examiner

*Primary Examiner* — Anh Mai
*Assistant Examiner* — Glenn Zimmerman
(74) *Attorney, Agent, or Firm* — King & Spalding LLP

(57) ABSTRACT

The present disclosure provides devices and techniques for a reversible mounting bracket. The reversible mounting bracket includes a pole mounting side and a wall mounting side. The pole mounting side and the wall mounting side are joined together at approximately 90°. When used to mount a fixture, such as a light fixture, to a wall, the wall mounting side is mounted to a wall, and the pole mounting side provides support for the fixture. When used to mount a fixture to a pole, the pole mounting side is mounted to a pole, and the wall mounting side provides support for the fixture. Thus, the same reversible mounting bracket can be used to mount a fixture to a pole or to a wall.

15 Claims, 4 Drawing Sheets

REVERSIBLE POLE OR WALL MOUNTING BRACKET

TECHNICAL FIELD

The present disclosure relates generally to a light fixture mounting bracket. Specifically, the present disclosure relates to a reversible mounting bracket for pole and wall mount applications.

BACKGROUND

Light fixtures are often mounted onto poles, walls, or other structures. In some cases, the same type of light fixture may be mounted to a wall or a poll, depending on the preference or requirements of the customer. For example, a barn light may be mounted to an outside wall of a building or to a light pole. Walls and poles, however, have different surface profiles, with walls generally being flat, and poles generally being round or curved. Such distinct surface profiles typically require different mounting brackets. Specifically, when mounting a light fixture to a wall, a mounting bracket designed for mounting light fixtures to walls is required. Likewise, when mounting a light fixture to a pole, a different mounting bracket designed for mounting light fixtures to poles is required. However, because the light fixture may be mounted to walls in certain applications and to poles in other applications, both wall bracket sets and pole bracket sets compatible with the light fixture are needed, adding to the cost, bulk, and complexity of the lighting system or product line.

SUMMARY

In an example embodiment of the present disclosure, a reversible mounting bracket includes a first mounting surface and a second mounting surface. The first mounting surface comprises a first protrusion and is substantially flat. The second mounting surface is coupled to the first mounting surface at an approximate right angle. The second mounting surface comprises a second protrusion and one or more angled surfaces to substantially conform to the curvature of a pole. The first mounting surface and the second mounting surface each comprise a plurality of coupling holes formed therein.

In another example embodiment of the present disclosure, a reversible mounting bracket includes a first mounting surface and a second mounting surface. The first mounting surface is substantially flat and comprises a first protrusion. The second mounting surface is coupled to the first mounting surface at an approximate right angle. The second mounting surface comprises a middle portion, a first side flange, a second side flange, and a second protrusion, wherein the first and second side flanges are disposed on opposite sides of the middle portion, and wherein the first and second side flanges are angled away from first mounting surface. The first mounting surface and the second mounting surface each comprise a plurality of coupling holes formed therein.

In another example embodiment, a reversible mounting bracket includes a wall mounting plate configured to be mounted to a wall and comprising a first protrusion tab, and a pole mounting plate configured to be mounted to a pole and comprising a second protrusion tab. The pole mounting plate is coupled to the wall mounting plate at an approximate 90° angle. The wall mounting plate mounts to the wall and the pole mounting plate couples to and supports a light fixture in a first mode. The pole mounting plate mounts to a pole and the wall mounting plate couples to and supports the light fixture in a second mode.

BRIEF DESCRIPTION OF THE DRAWINGS

For a more complete understanding of the disclosure and the advantages thereof, reference is now made to the following description, in conjunction with the accompanying figures briefly described as follows.

Figure 1:
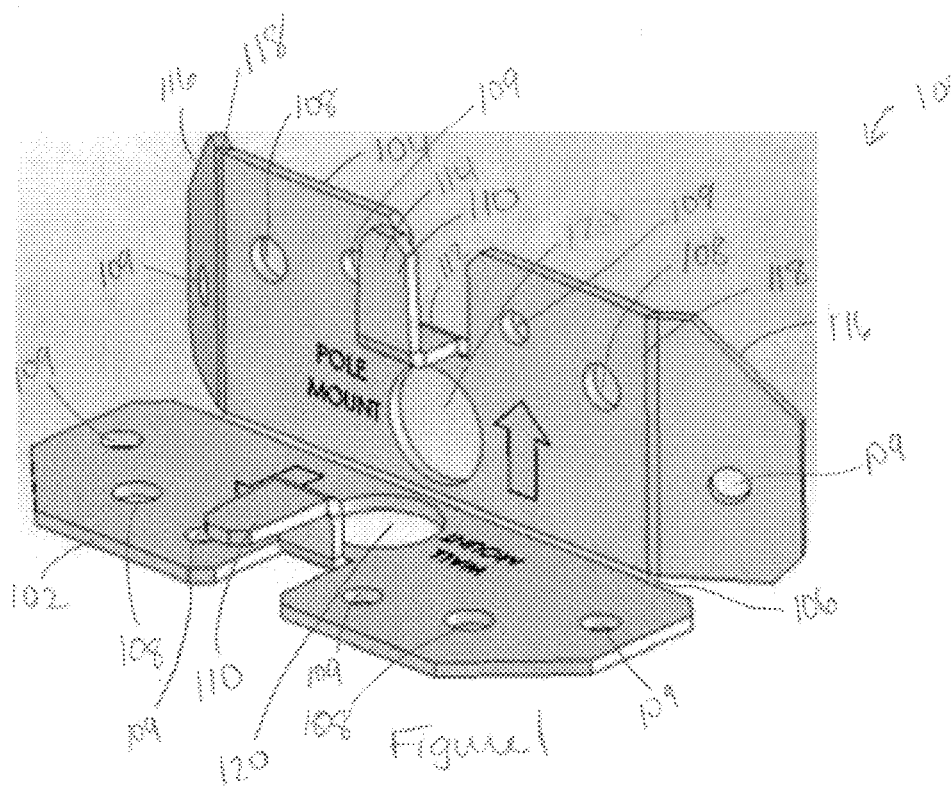
FIG. 1 illustrates a perspective view of a reversible mounting bracket, in accordance with example embodiments of the present disclosure.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of example embodiments of the present disclosure. Additionally, certain dimensions may be exaggerated to help visually convey such principles.

DETAILED DESCRIPTION OF EXAMPLE EMBODIMENTS

In the following paragraphs, the present disclosure will be described in further detail by way of example with reference to the attached drawings. In the description, well known components, methods, and/or processing techniques are omitted or briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s). The disclosure makes reference to a light fixture as one example fixture which is mountable with the example mounting brackets disclosed herein. However, other types of fixtures can also be used with the example mounting brackets disclosed herein. Any disclosure of sizes, dimensions, angles, or proportion, either in this description or the figures are provided for illustrative purposes only and may not be to scale, and reduction to practice of the present disclosure will result in various sizes, dimension, angles, and proportions, while remaining true to the techniques and principles disclosed herein. In the description, reference is made to a wall and a round pole, which represent mounting structures with two different surface profiles. Specifically, a wall refers to and is interchangeable with any mounting structure having a substantially flat profile, including a square post. Likewise, a round pole is one example of and interchangeable with any mounting structure having a curved or rounded profile.

The present disclosure provides devices and techniques for a reversible mounting bracket 100. The reversible mounting bracket 100 allows a fixture, such as a light fixture, to be mounted to a wall (or other flat surface) or a round pole, depending on the orientation of the reversible mounting bracket 100. FIG. 1 illustrates a perspective view of the reversible mounting bracket 100, in accordance with example embodiments of the present disclosure. Referring to FIG. 1, the reversible mounting bracket 100 includes a wall mount side 102 and a round pole mount side 104. The wall mount side 102 and the round pole mount side 104 are joined together at a 90° angle at an edge 106. In certain example embodiments, the reversible mounting bracket is fabricated from a continuous piece of material and bent at the edge 106 to form the wall mount side 102 and the round pole mount side 104. Each of the wall mount side 102 and the round pole mount side 104 includes a plurality of mounting holes 109 and a plurality of support holes 108 formed therein. Each of the wall mount side 102 and the round pole mount side 104 are mountable to a mounting structure (i.e., wall and pole) by securing the respective side 102 or 104 to the mounting structure with screws via the mounting holes 109. Each of the wall mount side 102 and the round pole mount side 104 can be coupled to a light fixture (or other fixture) by securing the respective side 102 or 104 to the light fixture with bolts or screws via their support holes 108. In certain example embodiments, the reversible mounting bracket 100 includes mounting holes of various sizes, compatible with different fasteners, such as screws, bolts, and the like, such that the desired fastener can be used with reversible mounting bracket 100. In certain example embodiments, one or both of the wall mount side 102 and the round pole mount side 104 include a wire conduit 120 through which electrical wires can travel between a mounted light fixture and an external power source.

Additionally, in certain example embodiments, one or both of the wall mount side 102 and the round pole mount side 104 include a support tab 110. In an example embodiment, the support tab 110 is an L-shaped tab, further having a base portion 112 and a hook portion 114. In certain example embodiments, the base portion 112 extends orthogonally from the respective side 102, 104 and in the direction of, and substantially parallel to, the other side 102 or 104. The hook portion 114 is bent from the base portion 112 at an approximately right angle such that the hook portion 114 is substantially parallel to the respective side 102 or 104, and substantially orthogonal to, and extending away from, the other side 102 or 104. For example, with respect to the support tab 110 of the round pole mount side 104, the base portion 112 of the support tab extends substantially orthogonally from the round pole mount side 104 and substantially parallel to, and in the same direction as, the wall mount side 102. In such an example, the hook portion 114 extends from the base portion 112 away from, and substantially orthogonally to, the wall mount side 102. The support hooks 110 are designed to receive and partially support a light fixture. In certain example embodiments, the support tab 110 is not square with the wall mount side 102 and the round pole mount side 104 (i.e., the support tab 100 does not have precisely parallel or perpendicular relationships with the side 102, 104). Rather, in certain example embodiments, the support tab 110, including the base portion 112 and the hook portion 114, are at an offset from a 90° angle to accommodate and exert a retaining force on the light fixture. Coupling of the reversible mounting bracket to the mounting structure and the light fixture will be discussed further below and with reference to FIGS. 2-4.

Figure 2:
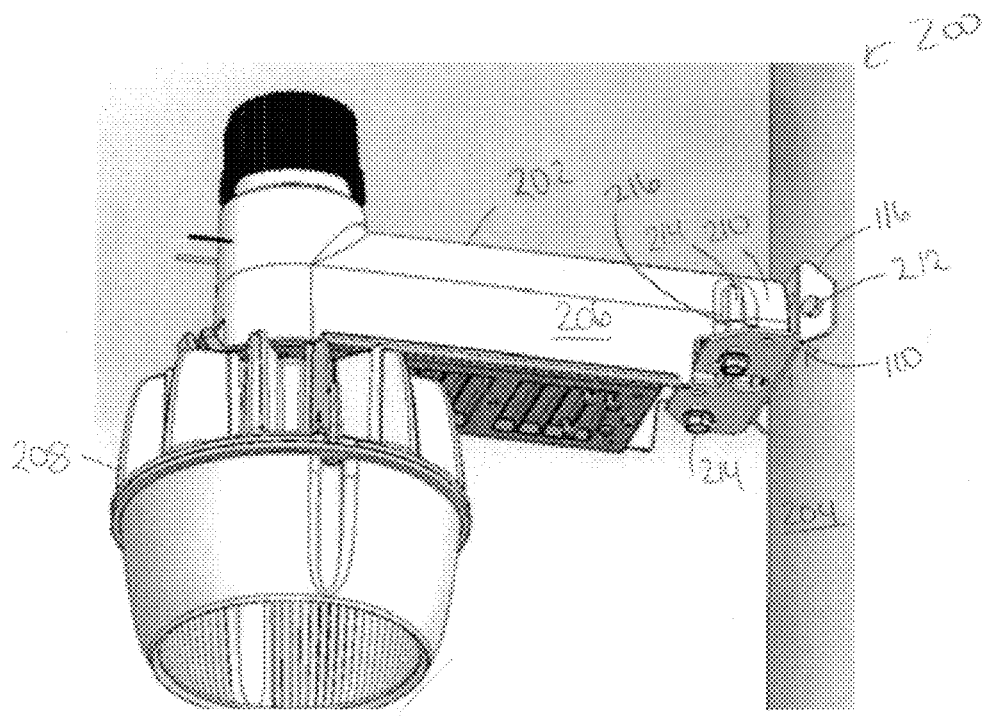
FIG. 2 illustrates a perspective view of the reversible mounting bracket of FIG. 1 being used to mount a light fixture in a round pole mount configuration, in accordance with example embodiments of the present disclosure.
Figure 3:
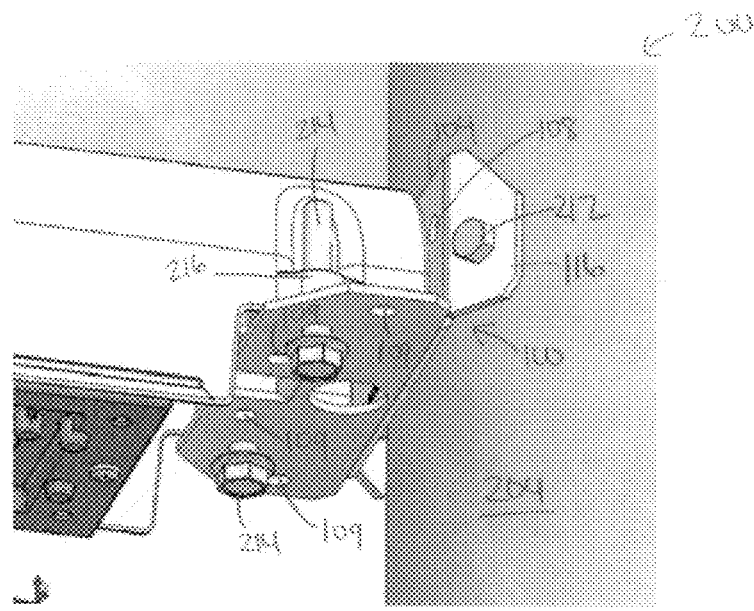
FIG. 3 illustrates a detailed perspective view of the reversible mounting bracket of FIG. 1 being used in the round pole mount configuration of FIG. 2, in accordance with example embodiments of the present disclosure.
Figure 4:
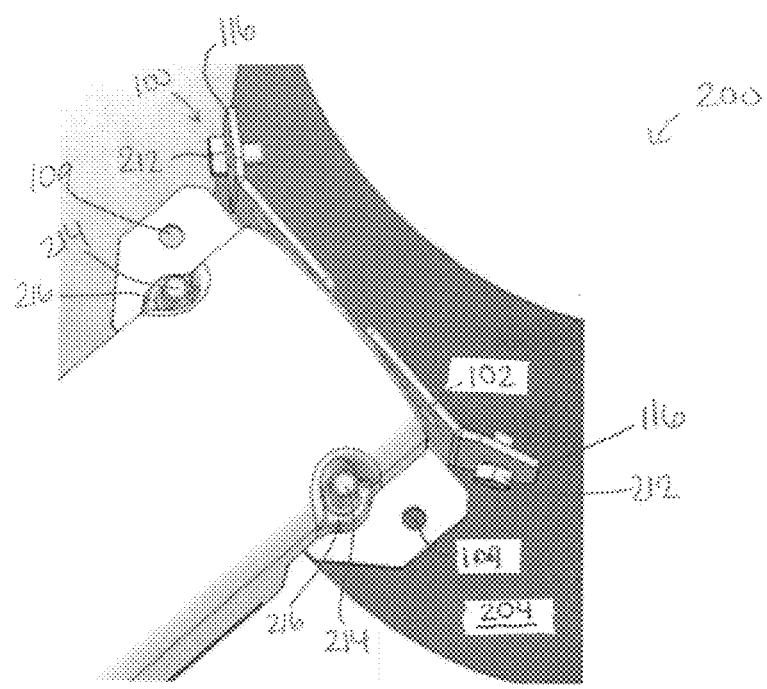
FIG. 4 illustrates a detailed top view of the reversible mounting bracket of FIG. 1 being used in the round pole mount configuration of FIG. 2, in accordance with an example embodiment of the present disclosure.

In certain example embodiments, the wall mount side 102 is substantially flat so as to complement the profile of a wall or wall-equivalent surface. The certain example embodiments, the round pole mount side 104 includes a pair of side panels 116 disposed adjacently to opposite edges 118 of the round pole mount side 104. In an example embodiment each of the side panels 116 are coupled to the round pole mount side 104 at an obtuse angle with respect to the round pole mount side 104, forming the edges 118 between each of the side panels 116 and the round pole mount side 104. When mounting the round pole mount side 104 to a pole, the side panels 116 hug around a portion of the pole, such as a standard wood utility pole. providing a more complementary engagement of the round pole mount side 104 to the pole. The side panels 116 further include one or more mounting holes 109 which allow the side panels 116 to be screwed into the pole for added security. In certain example embodiments, the reversible mounting bracket 100 is fabricated from stamped sheet metal FIG. 2 illustrates a perspective view of a pole mount configuration 200 in which the reversible mounting bracket 100 is used to mount a light fixture 202 to a pole 204, in accordance with example embodiments of the present disclosure. FIG. 3 illustrates a detailed perspective view of the reversible mounting bracket 100 in the pole mount configuration 200 of FIG. 2, in accordance with example embodiments of the present disclosure. FIG. 4 illustrates a detailed top view of the reversible mounting bracket 100 in the pole mount configuration 200 of FIG. 2, in accordance with example embodiments of the present disclosure. Referring to FIG. 2, in certain example embodiments, the light fixture 202 includes a housing 206 and a luminaire 208. The housing 206 includes a mounting base 210 which couples the light fixture 202 to the reversible mounting bracket 100 and thereby to the post 204.

In the pole mount configuration, the round pole mount side 104 of the reversible mounting bracket is mounted to and parallel with the pole 204 and the wall mount side 102 is orthogonal to the pole 204. The light fixture 202, specifically the mounting base 210, is mounted onto and supported by the wall mount side 101. In certain example embodiments, in the pole mount configuration, the mounting base 210 is also partially mounted onto and supported by the support hook 110 extending from the round pole mount side 104. Specifically, referring to FIGS. 2-4, in the pole mount configuration 200, the round pole mount side 104 is fastened to the pole 204 via screws 212 through the mounting holes 109 of the round pole mount side 104, and the wall mount side 102 is fastened to the mounting base 210 of the light fixture 202 via bolts 214 through the support holes 108 of the wall mount side 102. The bolts 214 traverse the support holes 108 and threaded bolt receivers 216 of the mounting base 210 of the light fixture 202, thereby securing the light fixture 202 onto the wall mount side 102 of the reversible mounting bracket 100. In an example embodiment, the reversible mounting bracket 100 and the bent edge 106 of the reversible mounting bracket are strong enough to support the light fixture 202 and mount the light fixture 202 to the pole 104 at an approximate right angle. In certain example embodiments, the reversible mounting bracket 100 is lag bolted into the pole 204. In certain example embodiments, the reversible mounting bracket 100 is secured to the pole using 2-4 mounting points (i.e., mounting holes and screws).

As illustrated in FIGS. 2-4, the side panels 116 are at an angle to the pole mounting side 104, thereby providing a closer and more complementary fit for the round profile of the pole 204, allowing the pole mounting side 104 to be more securing fastened thereon. In other example embodiments, the angle of the side panels 116 may vary depending on the profile of the intended post of mounting structure. In certain example embodiments, the angle of the side panels 116 are adjustable to accommodate a range of pole shapes and sizes.

Figure 5:
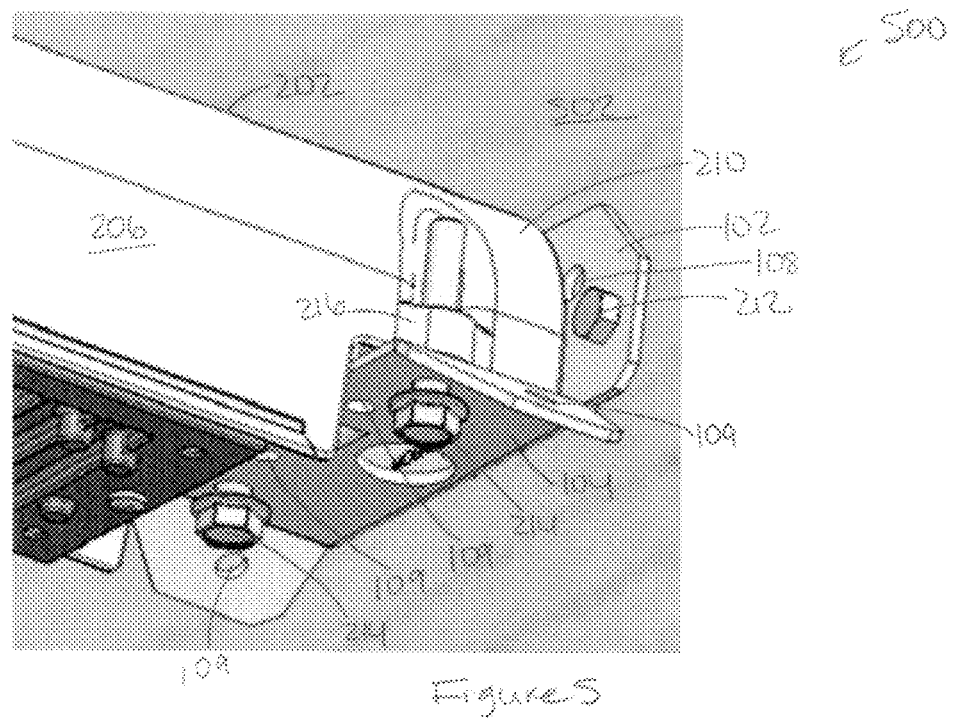
FIG. 5 illustrates a perspective view of the reversible mounting bracket of FIG. 1, in accordance with an example embodiment of the present disclosure.

FIG. 5 illustrates a perspective view of a wall mount configuration 500 of the reversible mounting bracket 100, in accordance with example embodiments of the present disclosure. Referring to FIG. 5, in the wall mount configuration 500, the wall mount side 102 of the reversible mounting bracket 100 is mounted to and parallel with the wall 502 and the round pole mount side 104 is orthogonal to the wall 502. The light fixture 202, specifically the mounting base 210, is mounted onto and supported by the round pole mount side 104. In certain example embodiments, in the pole mount configuration, the mounting base 210 is also partially mounted onto and supported by the support hook 110 extending from the wall mount side 104. Specifically, in the wall mount configuration 500, the wall mount side 102 is fastened to the wall 502 via screws 212 through the mounting holes 109 of the wall mount side 102, and the round pole mount side 104 is fastened to the mounting base 210 of the light fixture 202 via bolts 214 through the support holes 108 of the round pole mount side 104. The bolts 214 traverse the support holes 108 and the threaded bolt receivers 216 of the mounting base 210 of the light fixture 202, thereby securing the light fixture 202 onto the round pole mount side 104 of the reversible mounting bracket 100.

In the wall mount configuration 500, the wall mount side 102 of the reversible mounting bracket is secured to the mounting structure and the round pole mount side 104 is coupled to and supports the light fixture 202. In the pole mount configuration 500, the reversible mounting bracket 100 is reversed and the round pole mount side 104 is secured to the mounting structure and the wall mount side 102 is coupled to and supports the light fixture 202. Thus, one such reversible mounting bracket 100 can be used to mount a light fixture to at least either a pole or a wall, depending on the orientation of the reversible mounting bracket 100.

Figure 6:
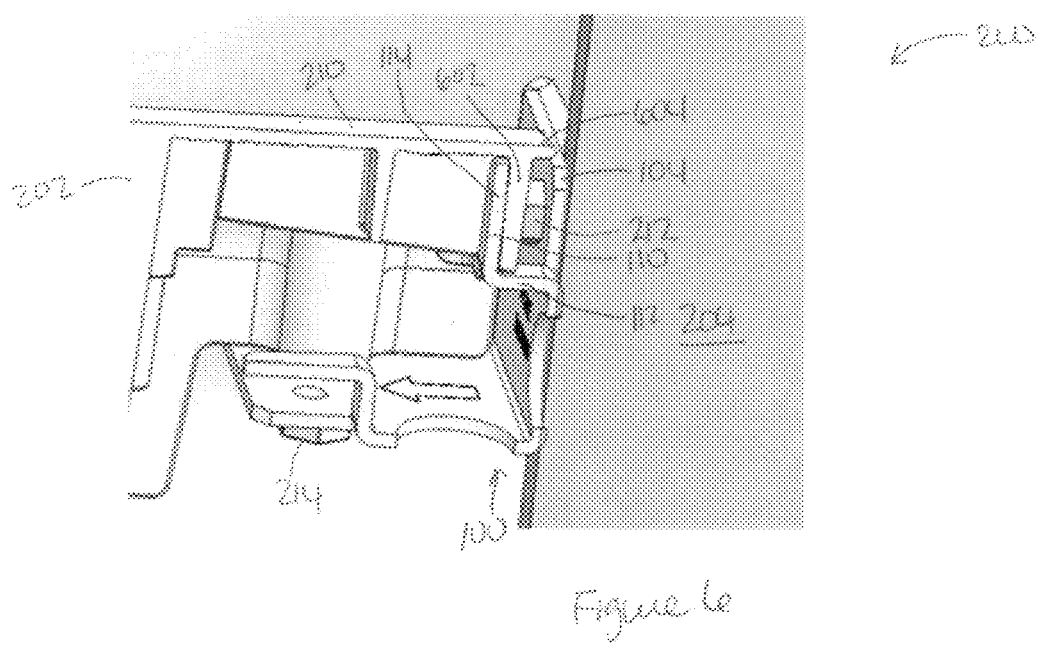
FIG. 6 illustrates a cross-sectional view of the reversible mounting bracket of FIG. 1 being used to mount a light fixture in a wall mount configuration, in accordance with an example embodiment of the present disclosure.

FIG. 6 illustrates a cross-sectional view of the pole mount configuration 200 of the reversible mounting bracket 100, in accordance with example embodiments of the present disclosure. Specifically, FIG. 6 illustrates the engagement of the mounting base 210 of the light fixture with the reversible mounting bracket 100 and in particular with support tab 110. Referring to FIG. 6, when the reversible mounting bracket 100 is in the pole mount configuration 200, the round pole mount side 104 is mounted to the pole 204 with screws, and the light fixture 202 is mounted to the wall mount side 102 of the reversible mounting bracket 100 and secured thereon with bolts. Additionally, in certain example embodiments, the mounting base 210 of the light fixture 202 includes an inner wall 602 which biases the support tab 110 when the lighting fixture 202 is mounted to the reversible mounting bracket 100. Specifically, in certain example embodiments, when positioning the light fixture 202 onto the reversible mounting bracket 100, the inner wall 602 is disposed between the support tab 100 and the pole 204. In certain example embodiments, the inner wall 602 includes a standoff edge 604 which mains a distance between the inner wall 602 and the pole 204.

Thus, as the standoff edge 604 is adjacent to the pole 204 or pole mounting side 104, the inner wall 602 is pushed against the hook portion 114 of the support tab 110. Thus, the light fixture 202 is further supported and stabilized. In certain example embodiments, this engagement also provides a means to temporary support and stabilize the light fixture 202 onto the reversible mounting bracket 100 before the bolts 214 are fastened, thereby allowing an operator to fasten the bolts through the reversible mounting bracket 100 and the bolt receivers 216 without also having to support the weight of the light fixture with their hands at the same time.

In certain example embodiments, the hook portion 114 of the support tab 110 of the round pole mount side 104 is bent at an angle greater than 90° with respect to base portion 112. This creates a wider space between the tip of the hook portion 114 and the pole or round pole mount side 104 than between the base of the hook portion 112 and the pole or round pole mount side 104. Thus, when the light fixture 202 is disposed onto the reversible mounting bracket 100, the inner wall 602 is more easily positioned between the hook portion 114 and the pole or round pole mount side 104 due to the expanded space therebetween. As the light fixture 202 is further lowered onto the reversible mounting bracket 100 and the inner wall 602 engaged further down the hook portion 112, the angled slope of the hook portion 114 brings the inner wall 602, and light fixture, closer to the pole 204 or round pole mount side 104 as the distance between the hook portion 114 and the pole or round pole mount side 104 becomes smaller. Thus, when the inner wall 602 is fully disposed along the hook portion 114, the light fixture 202 is pulled tight against the pole 204 or round pole mount side 104. Specifically, as the inner wall 602 is lowered onto the hook portion 114, more biasing force is extorted by the inner wall against the hook portion 114, increasing potential spring energy of the support tab, or the tendency to return to neutral. Therefore, a force is exerted by the hook portion 114 back onto the inner wall 602, pushing the inner wall and light fixture towards the pole 204. In certain example embodiments, the inner wall 602 is pulled further down the hook portion 114 and fully disposed thereon when the light fixture is bolted onto the wall mount side 102. This engagement further tightens and stabilizes the light fixture 202 against the pole 204, and keep the light fixture 202 substantially orthogonally to the pole 204. This engagement also helps to disperse the load of the light fixture 202 to multiple parts of the reversible mounting bracket 100. Specifically, the support tab 110 help move a portion of the load closer to the pole 204, where the weight generates less torque, making the mount more stable and reliable.

Although the example configuration of the reversible mounting bracket 100 is the pole mount configuration 200, the techniques and principled discussed with respect to FIG. 6 apply to the wall mount configuration (FIG. 5) as well. Specifically, the relevant structures and functions discussed herein with respect to FIG. 6 are, in certain example embodiments, symmetric and equivalent in both the wall mount side 102 and the round pole mount side 104 of the reversible mounting bracket 100. Thus, separate discussion of these techniques and principles with respect to the wall mount configuration is omitted for the sake of brevity.

Figure 7:
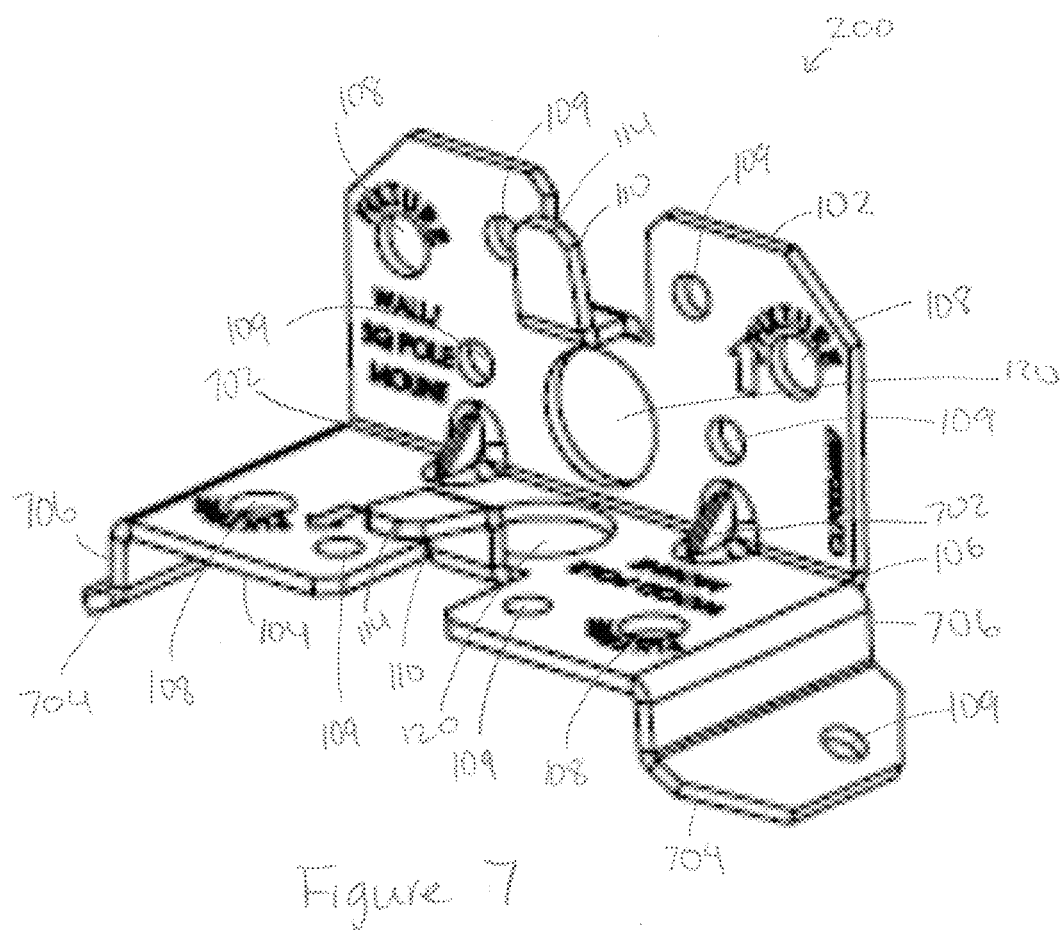
FIG. 7 illustrates a perspective view of another example embodiment of a reversible mounting bracket, in accordance with example embodiments of the present disclosure.

The reversible mounting bracket 100 illustrated in FIGS. 1-6 is one example embodiment of many embodiments and configurations of the reversible mounting bracket 100. FIG. 7 illustrates a perspective view of another example embodiment of the reversible mounting bracket 700, in accordance with certain example embodiments of the present disclosure. Similar to the reversible mounting bracket 100 illustrated in FIG. 1, the reversible mounting bracket 700 includes the wall mount side 102, the round pole mount side 104, the support holes 108, the mounting holes 109, the wire conduit 120, and the support hooks 110. In certain example embodiments, and as shown in FIG. 7, the mounting holes 109 of the reversible mounting bracket 700 are formed at different height levels. Such a configuration of mounting holes 109 spreads the weight of the light fixture to multiple vertical levels. Thus, the load experienced at each point is decreased, providing for a more reliable mount. In certain example embodiments, the reversible mounting bracket 700 includes various number or and sizes of mounting holes. For example the reversible mounting bracket 700 may include more mounting holes when designed to mount a larger light fixture. Furthermore, the hook portion 114 of the support tabs 110 are configured at an obtuse angle, providing the tightening effects described above.

In certain example embodiments, the reversible mounting bracket 700 further includes one or more gussets 702 at the edge 106 or bend of the reversible mounting bracket 700 between the round pole mount side 104 and the wall mount side 102. The gusset 702 reinforces the strength of the connection between the round pole mount side 104 and the wall mount side 102, providing increased stability, support, and reliability of the reversible mounting bracket. In certain example embodiments, the reversible mounting bracket 700 also includes a pair of side panels 704 disposed on opposite edges of the round pole mount side 104, similar in purpose to the side panels 116 of FIG. 1. The side panels 704 of the reversible mounting bracket 700 include a riser 706 portion which is coupled to the round pole mount side 104 The riser 706 provides some distance and flexibility between the side panel 706 and the round pole mount side 104. In certain example embodiments, the round pole mount side 104 include curved side panels, which conform to the curved profile of a pole.

Accordingly, although embodiments of the present disclosure have been described herein in detail, the descriptions are by way of example. The features of the disclosure described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

What is claimed is:

1. A reversible mounting bracket, comprising:
a first mounting surface, wherein the first mounting surface is substantially flat and comprises a first protrusion; and
a second mounting surface coupled to the first mounting surface at an approximate right angle, the second mounting surface comprising a second protrusion and one or more angled surfaces to substantially conform to a curvature of a pole;
wherein the first mounting surface and the second mounting surface each comprise a plurality of coupling holes formed therein,
wherein the first protrusion is an approximate L shaped protrusion comprising:
a first base portion that extends substantially perpendicular to the first mounting surface in a direction of and substantially parallel to the second mounting surface, and
a first hook portion that extends substantially perpendicular to the first base portion from an edge of the first base portion in a direction away from the second mounting surface and substantially parallel to the first mounting surface, and
wherein the second protrusion is an approximate L shaped protrusion comprising:
a second base portion that extends substantially perpendicular to the second mounting surface in a direction of and substantially parallel to the first mounting surface, and
a second hook portion that extends substantially perpendicular to the second base portion from an edge of the second base portion in a direction away from the first mounting surface and substantially parallel to the second mounting surface.

2. The reversible mounting bracket of claim 1, wherein the first and second mounting surfaces each comprise a wiring conduit orifice.

3. The reversible mounting bracket of claim 1, wherein the first mounting surface is configured to be fastened to a wall and the second surface is configured to be fastened to a light fixture in a first mode, and wherein the second mounting surface is configured to be fastened to the pole and the first surface is configured to be mounted to the light fixture in a second mode.

4. The reversible mounting bracket of claim 1, wherein the second mounting surface further comprises a middle portion, and
wherein the one or more angled surfaces comprise a first side flange, and a second side flange, wherein the first and second side flanges are disposed on opposite sides of the middle portion.

5. The reversible mounting bracket of claim 1, wherein the plurality of coupling holes formed within the first and second mounting surfaces are on more than one horizontal plane.

6. The reversible mounting bracket of claim 1, wherein each of the first and second mounting surface comprises a set of support holes and a set of mounting holes, wherein a light fixture is couplable to the reversible mounting bracket via the set of support holes, and the reversible mounting bracket is mountable to a mounting structure via the set of mounting holes.

7. A reversible mounting bracket, comprising:
a first mounting surface, wherein the first mounting surface is substantially flat and comprises a first protrusion; and
a second mounting surface coupled to the first mounting surface at an approximate right angle, the second mounting surface comprising a middle portion, a first side flange, a second side flange, and a second protrusion, wherein the first and second side flanges are disposed on opposite sides of the middle portion, wherein the first and second side flanges are angled away from the first mounting surface,
wherein the first mounting surface and the second mounting surface each comprise a plurality of coupling holes formed therein,
wherein the first protrusion comprises:
a first base portion that extends substantially perpendicular to the first mounting surface in a direction of and substantially parallel to the second mounting surface, and
a first hook portion that extends substantially perpendicularly to the first base portion from an edge of the first base portion in a direction away from the second mounting surface and substantially parallel to the first mounting surface, and wherein the second protrusion comprises:
  a second base portion that extends substantially perpendicular to the second mounting surface in a direction of and substantially parallel to the first mounting surface, and
  a second hook portion that extends substantially perpendicularly to the second base portion from an edge of the second base portion in a direction away from the first mounting surface and substantially parallel to the second mounting surface.

8. The reversible mounting bracket of claim 7, wherein at least one of the first protrusion and the second protrusion is configured to bias an internal wall of a lighting fixture.

9. The reversible mounting bracket of claim 7, wherein the first mounting surface is configured to be fastened to a wall and the second mounting surface is configured to be fastened to a fixture when the reversible mounting bracket is in a wall mount mode, and the second mounting surface is configured to be fastened to a pole and the first surface is configured to be mounted to the fixture when the reversible mounting bracket is in a pole mount mode.

10. The reversible mounting bracket of claim 7, wherein each of the first mounting surface and the second mounting surface comprises a set of support holes and a set of mounting holes, wherein a light fixture is couplable to the reversible mounting bracket via the set of support holes, and the reversible mounting bracket is mountable to mounting structure via the set of mounting holes.

11. A reversible mounting bracket, comprising:
  a wall mounting plate configured to be mounted to a wall and comprising a first protrusion; and
  a pole mounting plate configured to be mounted to a pole and comprising a second protrusion, the pole mounting plate coupled to the wall mounting plate at an approximate 90° angle,
  wherein the wall mounting plate mounts to the wall and the pole mounting plate couples to and supports a light fixture in a first mode; and
  wherein the pole mounting plate mounts to the pole and the wall mounting plate couples to and supports the light fixture in a second mod;
  wherein the first protrusion comprises:
    a first base portion that extends substantially perpendicular to the wall mounting plate in a direction of and substantially parallel to the pole mounting plate, and
    a first hook portion that extends substantially perpendicularly to the first base portion from an edge of the first base portion in a direction away from the pole mounting plate and substantially parallel to the wall mounting plate, and
  wherein the second protrusion comprises:
    a second base portion that extends substantially perpendicular to the pole mounting plate in a direction of and substantially parallel to the wall mounting plate, and
    a second hook portion that extends substantially perpendicularly to the second base portion from an edge of the second base portion in a direction away from the wall mounting plate and substantially parallel to the pole mounting plate.

12. The reversible mounting bracket of claim 11, wherein the wall mounting plate comprises a first set of holes for coupling the wall mounting plate to the wall and a second set of holes for coupling the wall mounting plate to the light fixture; and wherein the pole mounting plate comprises a third set of holes for coupling the pole mounting plate to the pole and a fourth set of holes for coupling the pole mounting plate to the light fixture.

13. The reversible mounting bracket of claim 11, wherein the wall mounting plate is substantially flat and the pole mounting plate comprises a flat portion and two side flanges on opposite ends of the flat portion.

14. The reversible mounting bracket of claim 13, wherein the two side flanges are curved.

15. The reversible mounting bracket of claim 13, wherein each of the two side flanges further comprise a bent portion.

\* \* \* \* \*